United States Patent
Vinicombe et al.

(10) Patent No.: US 11,288,453 B1
(45) Date of Patent: Mar. 29, 2022

(54) KEY-WORD IDENTIFICATION

(71) Applicant: Pinterest, Inc., San Francisco, CA (US)

(72) Inventors: Heath Vinicombe, San Francisco, CA (US); Yunsong Guo, San Mateo, CA (US); Yu Liu, Los Altos, CA (US); Anant Srinivas Subramanian, San Mateo, CA (US)

(73) Assignee: Pinterest, Inc., San Francisco, CA (US)

(*) Notice: Subject to any disclaimer, the term of this patent is extended or adjusted under 35 U.S.C. 154(b) by 179 days.

(21) Appl. No.: 16/361,871

(22) Filed: Mar. 22, 2019

(51) Int. Cl.
*G06F 40/30* (2020.01)
*G06F 40/284* (2020.01)
*G06N 20/00* (2019.01)
*G06F 40/289* (2020.01)

(52) U.S. Cl.
CPC .......... *G06F 40/284* (2020.01); *G06F 40/289* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 10,496,752 B1* | 12/2019 | Crossley | G06F 40/30 |
| 2005/0234879 A1* | 10/2005 | Zeng | G06F 16/3322 |
| 2017/0075996 A1* | 3/2017 | Azimi | G06F 16/335 |
| 2017/0132210 A1* | 5/2017 | Prasad | G06F 11/0748 |
| 2017/0364504 A1* | 12/2017 | Dandapat | G06F 40/279 |
| 2018/0322188 A1* | 11/2018 | Zhou | G06F 16/9535 |
| 2018/0365248 A1* | 12/2018 | Zheng | G06F 40/40 |
| 2019/0065471 A1* | 2/2019 | Comeau | G06F 40/30 |
| 2019/0065505 A1* | 2/2019 | Fukuda | G06F 40/30 |
| 2019/0188319 A1* | 6/2019 | Anerousis | G06F 16/313 |
| 2019/0392066 A1* | 12/2019 | Kim | G06F 40/35 |
| 2020/0020000 A1* | 1/2020 | Guy | G06F 40/56 |
| 2020/0117738 A1* | 4/2020 | Hassanzadeh | G06F 16/2465 |
| 2020/0272696 A1* | 8/2020 | Muraoka | G06F 40/30 |
| 2020/0272741 A1* | 8/2020 | Bhatia | H04L 63/0263 |
| 2020/0279017 A1* | 9/2020 | Norton | G06N 3/04 |

* cited by examiner

*Primary Examiner* — Seong-Ah A Shin
(74) *Attorney, Agent, or Firm* — Athorus, PLLC (57) ABSTRACT

Systems and methods are set forth for identifying key-words and key-phrases, collectively referred to as key-terms, from a document. A document is accessed and the document is tokenized, each token corresponding to a word or phrase occurring within the document. Term frequencies of the terms of the tokens may be determined and TF-IDF scores may be generated according to the term frequencies. Embedding vectors for the terms of the tokens may be generated and a document embedding vector may be generated according to the embedding vectors of the documents. A similarity score may be determined for each token according to the embedding vector of a token and the document embedding vector. Additionally, an overall score may be determined for each token according to the term of the token, a TF-IDF score, similarity scores, and the like. Terms from the highest scoring tokens are selected as the key-terms for the document.

20 Claims, 6 Drawing Sheets

KEY-WORD IDENTIFICATION

BACKGROUND

Identifying key-words and key-phrases from a document is an important aspect to recommender systems. As will be appreciated by those skilled in the art, recommender systems are online services that provide recommendations to persons (referred to as "computer users" or, more simply, as "users") based on a determined context of the users' activities. For example, if a user were viewing a web page, a recommender system might determine the context of the web page currently viewed by the user in order to recommend other, similar or complimentary web pages. Key-word (and/or key-phrase) identification is one of the tools that a recommender system uses to determine a likely context of the user, as well as to identify related content.

Term Frequency-Inverse Document Frequency (or TF-IDF, as it is more commonly referenced), is a numerical statistic that is intended to reflect how important a word (or phrase) is to a document in view of a collection or corpus of documents. More commonly, however, "TF-IDF" is viewed as an algorithm or process that generates TF-IDF values for words and phrases of a document (in view of the frequency of words/terms within a corpus of documents). In regard to the numerical value/statistic produced by the algorithm, a TF-IDF value increases proportionally to the number of times a word (or phase) appears in a given document and, at the same time, this increase is offset by the number of documents in the corpus that contain the word. This ratio or formula helps to adjust for the fact that some words (e.g., the word "the") appear more frequently in general. As it generates reasonable results, most recommender systems use TF-IDF to identify key-words and key-phrases, which are then used to identify context information and recommend other content to users.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

TF-IDF, in its various implementations, provides good results in identifying key words and key phrases of a document, as evidenced by its widespread use in recommender systems. However, "good results" can be improved upon, and in many instances, can be improved upon with significantly better results. The disclosed subject matter sets forth a novel approach to identifying key-terms (comprising both key-words and key-phrases) from a document with significantly improved predicted importance values.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" regarding multiple items should be viewed as meaning either or both items.

By way of definition, "key-word," as the term suggests, refers to a single word viewed as being important to a document, and the term "key-phrase" refers to a collection of two or more words that refer to a single concept or entity and viewed as being important to the document. Additionally, while the disclosed subject matter is suitably configured to identify both key-words and key-phrases from a document, with corresponding predicted importance values, for simplicity in description and ease of reading, the term "key-term" will be used throughout this document and should be viewed as meaning key words and/or key phrases.

According to aspects of the disclosed subject matter, a key-term identification process or system generates key-terms with corresponding predicted importance values for a given document. This process includes identifying a collection of key-terms (words and phrases) from within a document and in view of a corpus of documents. In various embodiments, a tokenization process is conducted on the document to identify the "terms" (including both words and phrases) of the document. A TF-IDF process is used to identify a set of candidate key-terms from the set of tokenized terms. In various embodiments, this TF-IDF process uses weighted term frequencies according to predetermined weights associated with the source locations of the terms. In addition to performing the weighted TF-IDF process to generate key-terms for the document, an embedding vector (also referred to as a feature vector) is generated for each of the identified key-terms. These term-associated embedding vectors are used to generate a document embedding vector as a type of overall, representative embedding vector for the document. With the document embedding vector generated, a similarity score between each key-term and the document (based on the embedding vectors) is determined, where the similarity score represents a similarity value indicating the importance of the key-term to the document.

Figure 1:
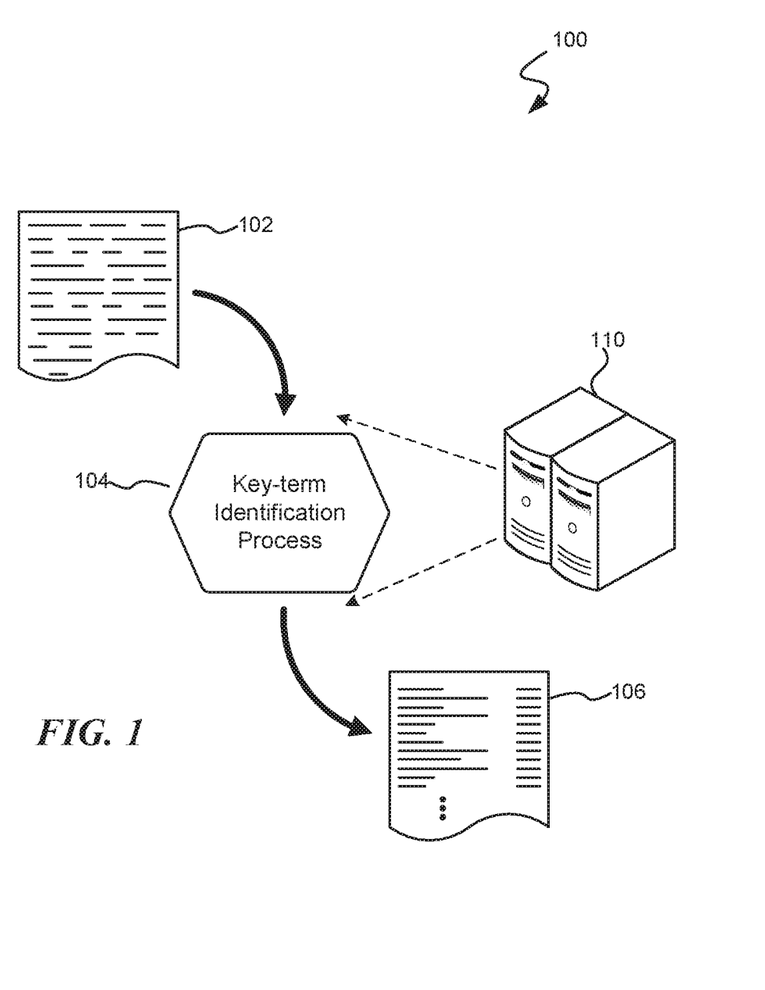
FIG. 1 is pictorial diagram illustrating an exemplary flow of document content through a computer-implemented process to generate an ordered list of key-terms of the document, ordered according to a determined, predicted importance to the document in accordance with aspects of the disclosed subject matter.

Turning to the figures, FIG. 1 is a pictorial diagram illustrating an exemplary computer-implemented process 100 to generate an ordered list 106 of key-terms of a document 102, ordered according to a determined, predicted importance to the document and in accordance with aspects of the disclosed subject matter. More particularly, the document 102 is passed to a key-term identification process 104. As will be described in greater detail below, the result of this key-term identification process 104 is the generation of an ordered list 106 of key-terms. As shown in FIG. 1, the key-term identification process 104 is a computer-implemented process, meaning that it is implemented on (or hosted on) one or more computing systems, such as computing system 110. Of course, while FIG. 1 illustrates that the key-term identification process 104 is implemented on a single computing system 110, this is for illustration purposes and should not be construed as limiting upon the disclosed subject matter. In various embodiments, the key-term identification process 104 may be implemented across multiple computing systems distributed throughout a communication network.

Regarding document 102, while aspects of the disclosed subject matter are suitably configured to operate on a discrete body of textual content, e.g., a text file as one might imagine or view as a typical "document," the disclosed subject matter is not so limited. Indeed, by way of definition and according to aspects of the disclosed subject matter, a "document" should be viewed as any collection of textual content that is viewed collectively and as a whole, irrespective of how the content is stored (i.e., whether as a cohesive body or text or as a collection of textual content from multiple sources.) For example, a "document" may correspond to textual content associated with and relating to an image posted to an online hosting service or social networking service. The "document" associated with the image may include, by way of illustration and not limitation, a text-based caption of the image, user comments and/or descriptions associated with the image, a source URL of the image, textual content of the landing page of the source URL, textual content determined by a process as to the subject matter of the image, and the like. According to aspects of the disclosed subject matter, each of these individual items of textual content collectively form a "document" from which key-terms can be identified.

Figure 2:
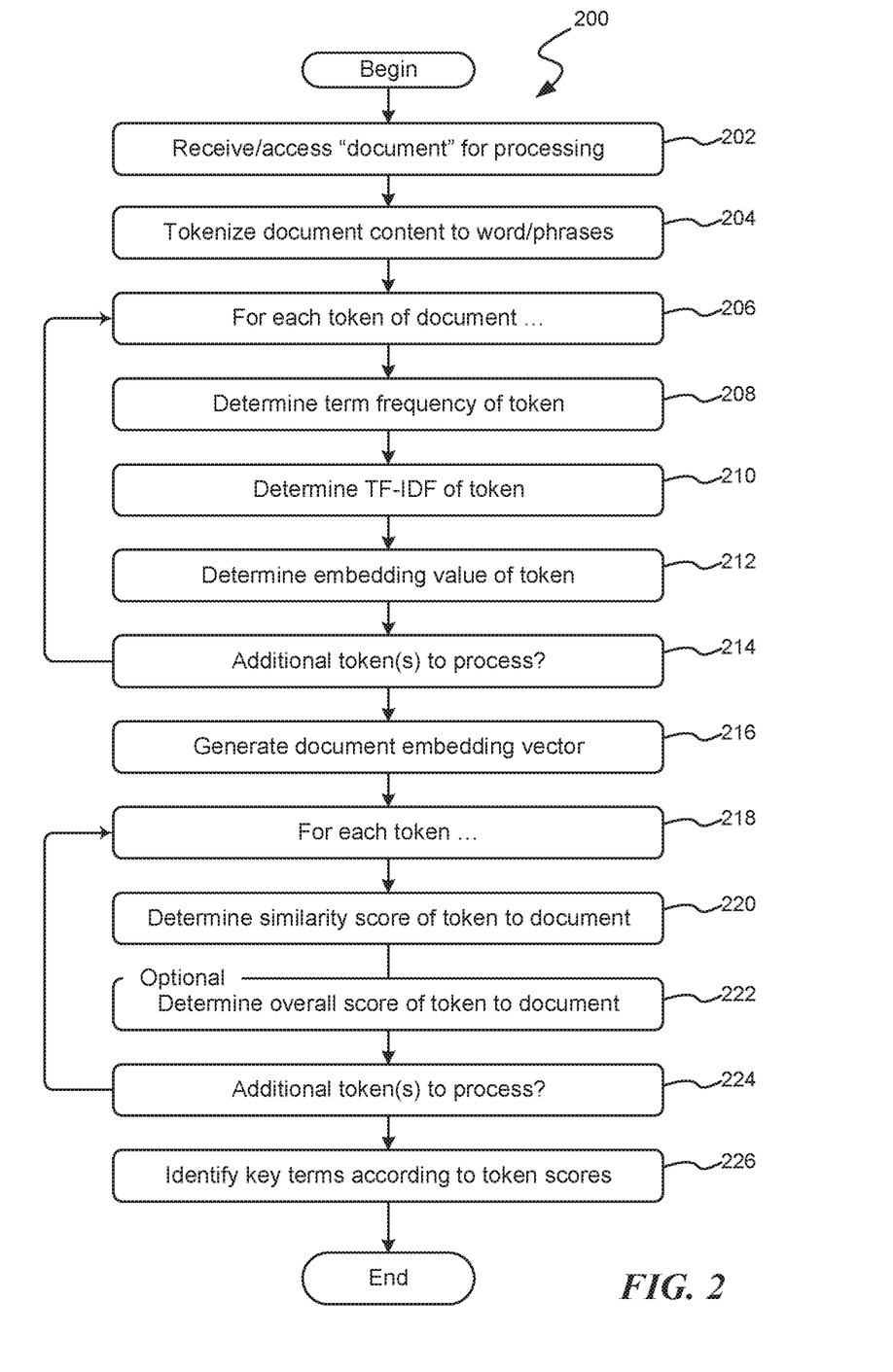
FIG. 2 is a flow diagram illustrating an exemplary routine suitable for identifying key-terms of a document with a corresponding predicted importance of the key-term in accordance with aspects of the disclosed subject matter.
Figure 3:
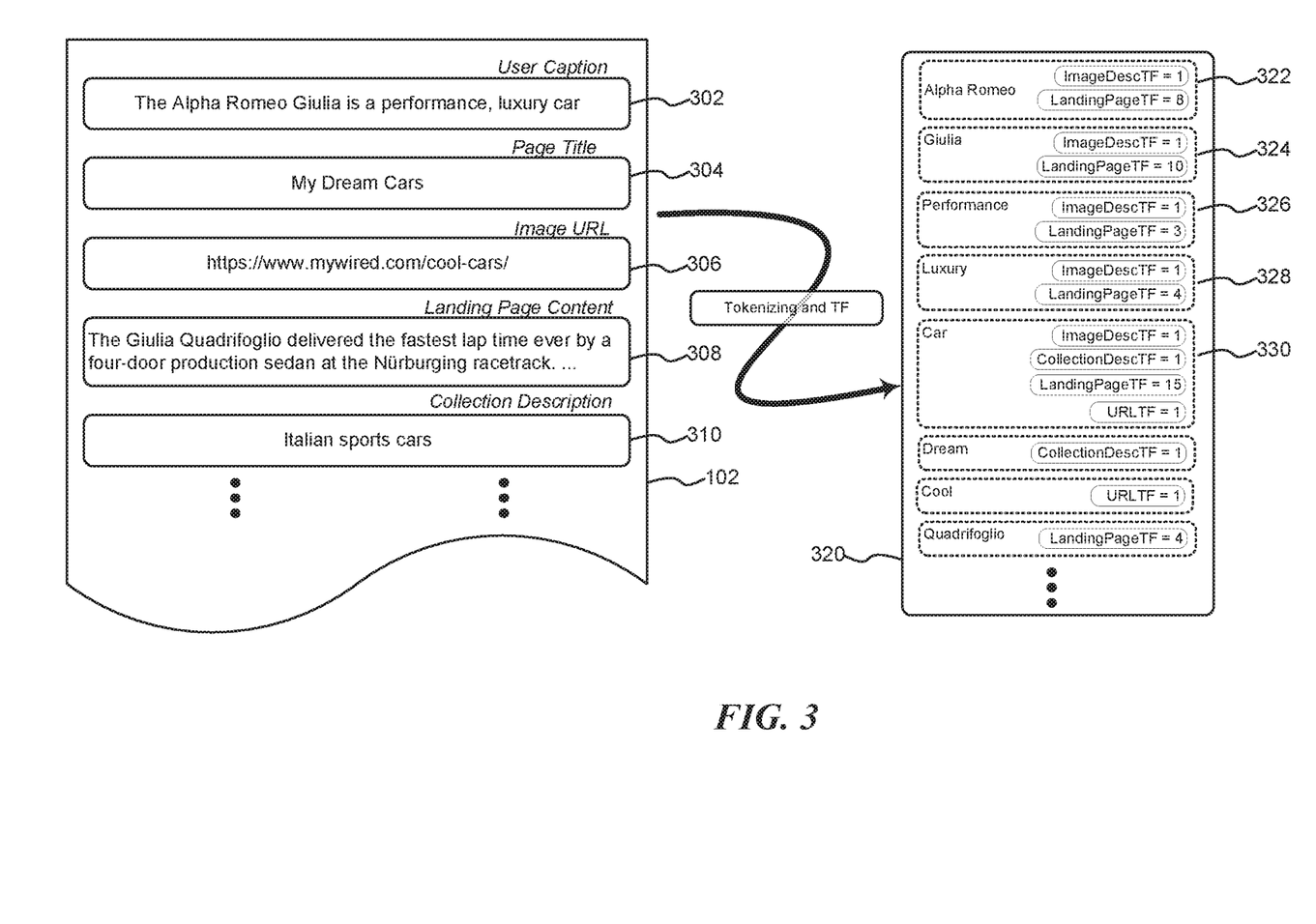
FIG. 3 is a pictorial diagram illustrating exemplary results of tokenizing a document and determining term frequencies of the key-terms/tokens of the document in accordance with aspects of the disclosed subject matter.

Regarding the computer-implemented key-term identification process 104, reference is now made to FIGS. 2 and 3. FIG. 2 is a flow diagram illustrating an exemplary routine 200 suitable for identifying key-terms of a document with a corresponding predicted importance of the key-term to the document in accordance with aspects of the disclosed subject matter. FIG. 3 is a pictorial diagram illustrating exemplary results of tokenizing a document 102 and determining term frequencies of the key-terms/tokens of the document in accordance with aspects of the disclosed subject matter.

Beginning at block 202, the exemplary process accesses (or receives) the document, such as document 102, to be processed. As indicated above, this document may be comprised of multiple elements each related to other, non-textual content such that, collectively, they form the entirety of the "document." As shown in FIG. 3, the exemplary document 102 is comprised of independent, multiple elements/text sources relating to an image. These elements or text sources include, as shown in FIG. 3 and by way of illustration and not limitation, a user-supplied caption 302 for an image, a title 304 of the page on which the image is posted, the textual content 306 of the source URL from which the image originates, textual content 308 of the landing page of the source URL, user comments 310 regarding the image, and the like.

At block 204, the textual content of the document is converted to tokens, each token comprising a word or a phrase. In regard to tokenizing words or phrases, while segmenting textual content into words according to white space and punctuation is relatively straight-forward, generating tokens comprising multiple words may involve consulting with one or more topical and/or entity dictionaries and/or ontologies to identify when two or more adjacent words, when combined, form a phrase. Context of the document may also be considered when tokenizing phrases. For example, textual content referring to Italian sports cars may include a phrase, "The Alpha Romeo Giulia is a performance, luxury car," as shown as textual content 302 in document 102. In tokenizing this textual passage and according to aspects of the disclosed subject matter, when encountering the adjacent words "Alpha" and "Romeo", the tokenizing process may consult a dictionary and determine that "Alpha Romeo" is a known entity and generate a single token for the combined words.

Token table 320 of FIG. 3 illustrates exemplary tokens (words and phrases) generated from the document 102. For illustration purposes, these generated tokens include token 322 corresponding to "Alpha Romeo", token 324 corresponding to the text "Giulia", token 326 corresponding to "Performance", token 328 corresponding to the text "Luxury", and token 330 corresponding to "Car" (which may also represent the plural form of the word, "Cars"). In various embodiments and as shown in FIG. 3, tokens within the token table 320 include information regarding the source or location in which an instance of the token is encountered, i.e., document location information for the token. For example, token 322 indicates that the textual content, Alpha Romeo, was encountered one time in the Image Description/ Caption (corresponding to "ImageDescTF") and encountered eight times on the landing page of the source URL (corresponding to "LandingPageTF").

As part of generating tokens from the content of the document, it should be appreciated that each time a word or phrase is encountered in the document, a token is generated, if not already encountered, and a count for that token is increased/incremented. The purpose is to tokenize the content and, in so doing, establish some measure of count or means for counting the number of times each token occurs within the document as well as the location(s) that the token appears.

At block 206, after having generated tokens, e.g., tokens 322-330, from the textual content of the document 102, a first iteration loop is begun. As described below, this iteration loop is carried out to determine TF-IDF values or scores for the tokens and, additionally, to determine an embedding vector for each of the tokens in the document 102.

As part of the first iteration loop and with regard to a first token of the document 102, at block 208 a term frequency (TF) for the currently iterated token is determined. This term frequency indicates how many times the currently iterated token appears within the document. Depending on how the tokenizing process is implemented, this term frequency may be already determined (the counts associated with the token as discussed above in regard to FIG. 3) or a count is conducted at this point of all of the instances of the token in the document, as well as indicating their locations in the document.

At block 210, the TF-IDF score for the currently iterated token is determined. As indicated above, in one embodiment this TF-IDF score is generated as a function of the term frequency (TF) of the document, i.e., the count or number of instances of the token in the document, and the overall frequency of the term in a corpus of documents. In various embodiments, this overall frequency is determined for tokens based on their overall frequency among a large corpus of documents. A general formula of this function is as follows:

$$TF\text{-}IDF\text{-score(token)} = \frac{tf(\text{token, document})}{tf(\text{token, corpus})}$$

This determined TF-IDF score is then associated with the token.

According to aspects of the disclosed subject matter, a weighted TF-IDF algorithm is used to generate the corresponding TF-IDF score. More particularly, in determining the term frequency value of the token, weighting information may be applied according to a predetermined weighting factor based on the location of one or more instances of the token in the document. For example and as shown in token 322, "Alpha Romeo" occurred only once in the image description/caption so that count, without weighting would be "1." However, in embodiments where the image description/caption is viewed as having significant importance, a weighting factor corresponding to the location (image description) is applied. Assuming, for example, that the weighting factor is 3, then the count for the instance of token 322 in the image description would be 3. More generally, the increment amount for encountering an instance, $t_i$, of a given token, t, in a location is determined according to the formula:

count$_t$+=1·weight(location($t_i$)), where weight( ) determines the weight according to location, and location( ) identifies the location of the current instance of the encountered token. In this manner, the count for tokens found in locations that are perceived to be less valuable are marginally incremented (e.g., 0.5 increment, if incremented at all) while the count for tokens found in locations that are perceived to be more important or relevant may be substantially incremented (e.g., an increment of 2 or 3). Continuing the example from above and assuming that the weighting value for the token in the landing page is 1.5, the total term frequency for the token, "Alpha Romeo", using the weighted TF-IDF formulation, is determined as 1·3+8·1.5, or 15.

At block 212, in addition to determining a TF-IDF score for the currently iterated token, an embedding vector is also determined and associated with the token. As those skilled in the art will appreciate, an embedding vector is a projection of the token (or the textual content represented by the token) into a multi-dimensional space. Thus, an embedding vector may be viewed as an array of values, the length of the array being equal to the number of dimensions of the multi-dimensional space, and each element of the array corresponding to a dimension of the multi-dimensional space. Often, though not exclusively, this embedding vector is generated by a trained machine learning model. Various online services are available to generate an embedding vector for a given word or phrase, including services by conceptnet.io, fasttext.cc, or one or more other online semantic network services providers.

At block 214, as part of the iteration loop, if there are additional tokens to process, the routine 200 returns to block 206 and the next token is selected for processing. Alternatively, if there are no additional tokens to process, the routine 200 proceeds to block 216.

In addition to associating a TF-IDF score and embedding vector with each token, an overall understanding of the document itself can also lead to further refining the importance of the tokens to the document. Accordingly, at block 216, a document embedding vector is generated. According to aspects of the disclosed subject matter, this document embedding vector is generated as an average of the embedding vectors of the various tokens of the document. According to aspects of the disclosed subject matter, determining an average of embedding vectors for a document embedding vector may be determined according to the following formula:

$$documentEV[i] = \frac{\sum_{1}^{x} tokenEV_x[i]}{x}$$

where documentEV is the document embedding vector, x is the total number of tokens of the document, tokenEV$_x$ is the token embedding vector of the $x^{th}$ token of the document, and i is the number of dimensions in the embedding vectors (both document and token embedding vectors.)

According to additional aspects of the disclosed subject matter, the document embedding vector may be determined as a weighted average of the embedding vectors of the tokens. More particularly, the weighted average may incorporate the TF-IDF scores of the tokens in computing the averages of the various dimensions of the embedding vectors, such that embedding vector values for tokens with higher TF-IDF scores are weighted more strongly in the averaging process than the embedding vector values for tokens with lower TF-IDF scores. A formula for determining a document embedding vector according to this weighted average is as follows:

$$documentEV[i] = \frac{\sum_{1}^{x} (tokenEV_x[i] \cdot \text{weight}(tf - idf - score_x))}{x}$$

where tf-idf-score$_x$ is the TF-IDF score of the x' token of the document, and weight( ) is a function that returns a scalar to be multiplied against the elements of the embedding tokenEV$_x$ in adjusting each dimension of the vector, resulting in a weighting of the embedding vector in determining the document embedding vector.

After generating an embedding vector for the document, at block 218 a second iteration loop is begun. In this second iteration loop, an overall similarity score (between the token and the document) is computed for each token. Thus, at block 220, a similarity score between the currently iterated token and the document is determined as a function of one or more scores associated with the currently iterated token and the document embedding vector. According to various embodiments of the disclosed subject matter, the similarity score is determined according to the cosine similarity between the token's embedding vector and the document's embedding vector. According to aspects of the disclosed subject matter, a higher similarity score is an indication that a corresponding token has a similarly high importance to the document.

While tokens may be evaluated according to their similarity scores, with the highest scoring tokens being viewed as key-terms for the document 102, at block 222 an optional step may be performed to further refine the score of the tokens. More particularly, at block 222, the token and corresponding values/score now associated with the token are provided to a trained machine learning model, where an analysis is carried out to generate a predicted overall score for the token with respect to the document. Indeed, information such as, by way of illustration and not limitation, the token, term frequencies of the token, the TF-IDF score of the token, the similarity score for the token and the embedding vector of the token are provided to the trained machine learning model to determine the predicted overall score. This overall score is then associated with the currently iterated token.

At block 224, as part of the second iteration loop, if there are additional tokens to process the routine 200 returns to block 218 for the additional processing. Alternatively, if there are no additional tokens to process/score, the routine proceeds to block 226. It should be appreciated, however, that these tokens/scores tuples now represent the key-terms of the document 102.

In addition to the above, after the tokens have been scored, the tokens may optionally be sorted according to their scores, whether it is the cosine similarity score or the predicted overall score generated by the machine learning model, to generate an ordered list of tokens (key-terms) for the document based on their corresponding scores.

At block 226, key-terms (as embodied in the tokens) are identified for the document according to scores associated with the tokens. In various embodiments, the selection of key-terms is based on the similarity scores associated with the tokens. Alternatively, the selection of key-terms is based on the overall scores that may be associated with the tokens. Further, in various embodiments, the key-terms of a predetermined number of highest scoring tokens are selected as the important key terms for the document. Alternatively, key-terms for the document may be identified according to a threshold score: that the key-terms of all tokens with a score at or above a threshold value are viewed as the important key terms for the document.

After identifying the key-terms of the document, the routine 200 terminates.

Figure 4:
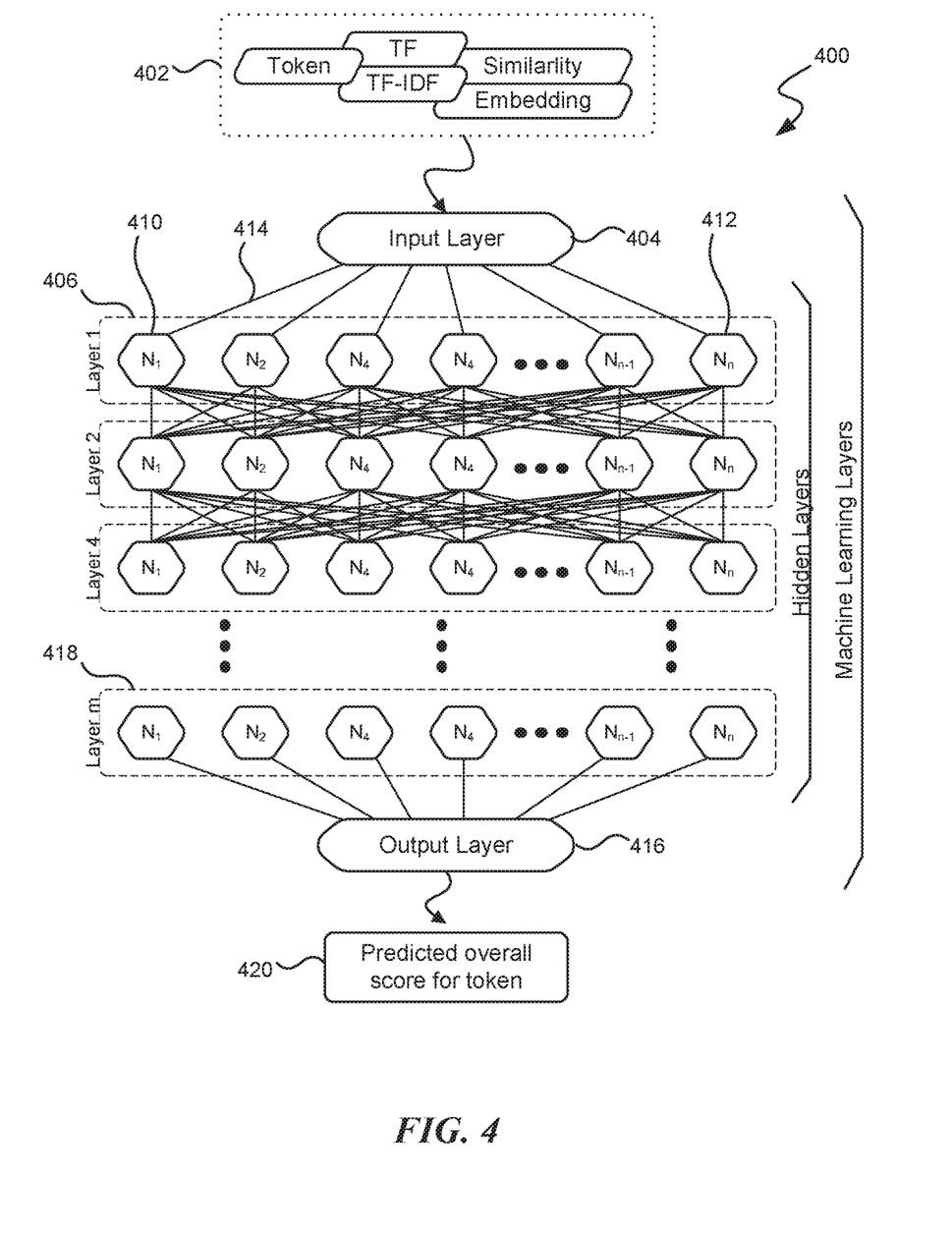
FIG. 4 is a block diagram illustrating elements of a deep learning/machine learning model suitable for generating a predicted overall score indicative of the importance of a key-term to a document and in accordance with aspects of the disclosed subject matter.

Turning to FIG. 4, FIG. 4 is a block diagram illustrating elements of a deep learning/machine learning model 400 suitable for generating a predicted overall score indicative of the importance of a key-term to a document and in accordance with aspects of the disclosed subject matter.

As those skilled in the art will appreciate, the machine learning model 400 (also known as a deep neural network) is a framework of executable components comprising multiple executable layers of processing nodes. The executable layers include an input layer 404, and output layer 416, and one or more hidden layers. For example, and by way of illustration in FIG. 4, the executable machine learning model 400 includes m hidden layers, including hidden layers 406 and 418. As suggested above, the input layer 404 accepts the input data 402 which is evaluated in generating a predicted overall score for a given token. According to aspects of the disclosed subject matter, the input data 402 includes, by way of illustration and not limitation, the token, term frequencies of the token, document location information, the TF-IDF score of the token, the similarity score of the token (as compared to the document embedding vector), the embedding vector of the token, and the like. The input data 402 may further include the document and document embedding vector. Based on this input data 402, the machine learning model 400 evaluates the data and generates a corresponding result: a predicted overall score for the token.

The input layer 404 accepts the input data 402 and, according to one or more predetermined algorithms and/or heuristics, generates a plurality of intermediate values for one or more aspects, features and/or facets from that input data. These values (not illustrated but implied by the various edges, such as edge 414, extending from the input layer 404 to the various processing nodes of the first hidden layer 406) are output values of the first layer and are distributed as input data to one or more processing nodes, such as processing nodes 410 and 412, in the first of the hidden layers of the executable model 400.

Typically, though not exclusively, a value/facet of the input data passed from the input layer 404 to a first processing node in the first hidden layer, such as processing node 410 of hidden layer 406, may be different than a value/facet passed to a second processing node of that same hidden layer, such as to node 412 of hidden layer 406. Of course, while model 400 suggests that there is 1:1 relationship between output values of the input layer and input nodes of the first hidden layer, this should be understood to be illustrative and not limiting upon the disclosed subject matter. Indeed, in various embodiments, all output values of a first given layer are provided as input values to each processing node in the next layer.

Each hidden layer comprises a plurality of executable processing nodes, each processing node carrying out some function that convolves the input data to the processing node into output data. By way of illustration and not limitation, hidden layer 406 includes n processing nodes $N_1$-$N_n$. While the processing nodes of the first hidden layer 406 typically, though not exclusively, have a single input from the input layer, processing nodes of subsequent hidden layers typically have input values from one or more processing nodes of the previous input layer. As illustrated in executable model 400, though not intended as a limitation of the disclosed subject matter, each hidden layer (except for the first hidden layer 406) accepts input data/signals from each of the processing nodes of the prior hidden layer, as indicated by the edges proceeding from a processing node of an "upper" hidden layer (e.g., layer 406) to a "lower" hidden layer.

As mentioned, each executable processing node implements one or more "convolutions" or "computations" on the input data it receives (whether the processing node receives a single item of input data, or plural items of input data) to produce an output value (or, more simply, an output). These convolutions/computations may include any number of functions to generate the output data, such as (by way of illustration and not limitation) aggregations, clusterings, transformations, combinations, selections and/or filters, mathematical manipulations, linear and multivariate regressions, statistical determinations and predictions, and the like. Moreover, individual items of input data may be weighted such that a given item of input data plays a greater or lesser role in the overall computation of any processing node. Items of input data may be weighted in such a manner as to be ignored in convolution. Hyperparameters (data/values that are input from sources external to processing nodes of a prior input level) may also be utilized by all or some of the processing nodes of a hidden layer.

As will be appreciated by those skilled in the art, one of the interesting aspects of machine learning technology is that the various levels of the machine learning model are often self-learning, meaning that when provided feedback regarding output accuracy, modifications are made to the weights, parameters, and processing of nodes in the various layers in order to achieve better results. Thus, except for initially established computations of the various processing nodes in a training phase of the machine learning process, a person is unlikely to have specific insight or knowledge as to the exact computations that any particular processing node of a hidden layer may utilize. This is especially true of unsupervised training models that determine the accuracy of data according to heuristics, rules and goals. During the training process of a machine learning process, the machine learning process makes its own determinations as to how to modify each computation to produce better/superior results for the input values it receives.

At the final hidden input layer, e.g., layer 418, the executable processing nodes provide their output values to the output layer 416. The output layer 416 performs its own convolutions or computations including, by way of illustration and not limitation, aggregations, calculations, normalizations and/or interpretations of the various items of input data to produce an output value of the model. In the illustrated example, the output layer 416 produces a predicted overall score 420 for the token, indicating a prediction as to the importance of the token as a key-term of the document. According to one embodiment of the disclosed subject matter, to produce the predicted overall score for the token, the output layer 416 aggregates and/or convolves together each item of output data from the final hidden layer 418.

Regarding routine 200 and the processes indicated in FIGS. 1, 3 and 4 described above, while these routines and/or processes are expressed as discrete, descriptive steps, these steps should be viewed as being logical in nature and may or may not correspond to any specific actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted. Optimizations of routines may be carried out. Those skilled in the art will recognize that the logical presentation of steps is sufficiently instructive to carry out aspects of the claimed subject matter irrespective of any specific development or coding language in which the logical instructions/steps are encoded. Additionally, while some of these routines are expressed in the context of recursive routines, those skilled in the art will appreciate that such recursive routines may be readily implemented as non-recursive calls without actual modification of the function or result. Accordingly, the particular use of programming and/or implementation techniques and tools to implement a particular functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard to FIG. 6 below. Additionally, in various embodiments all or some of the various routines may also be embodied in executable hardware modules including, but not limited to, systems on chips (SoC's), codecs, specially designed processors, logic arrays and/or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like. In execution, these various executable constructs configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single- or narrowly-purposed applications), online services and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted and/or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver or transmit the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 5:
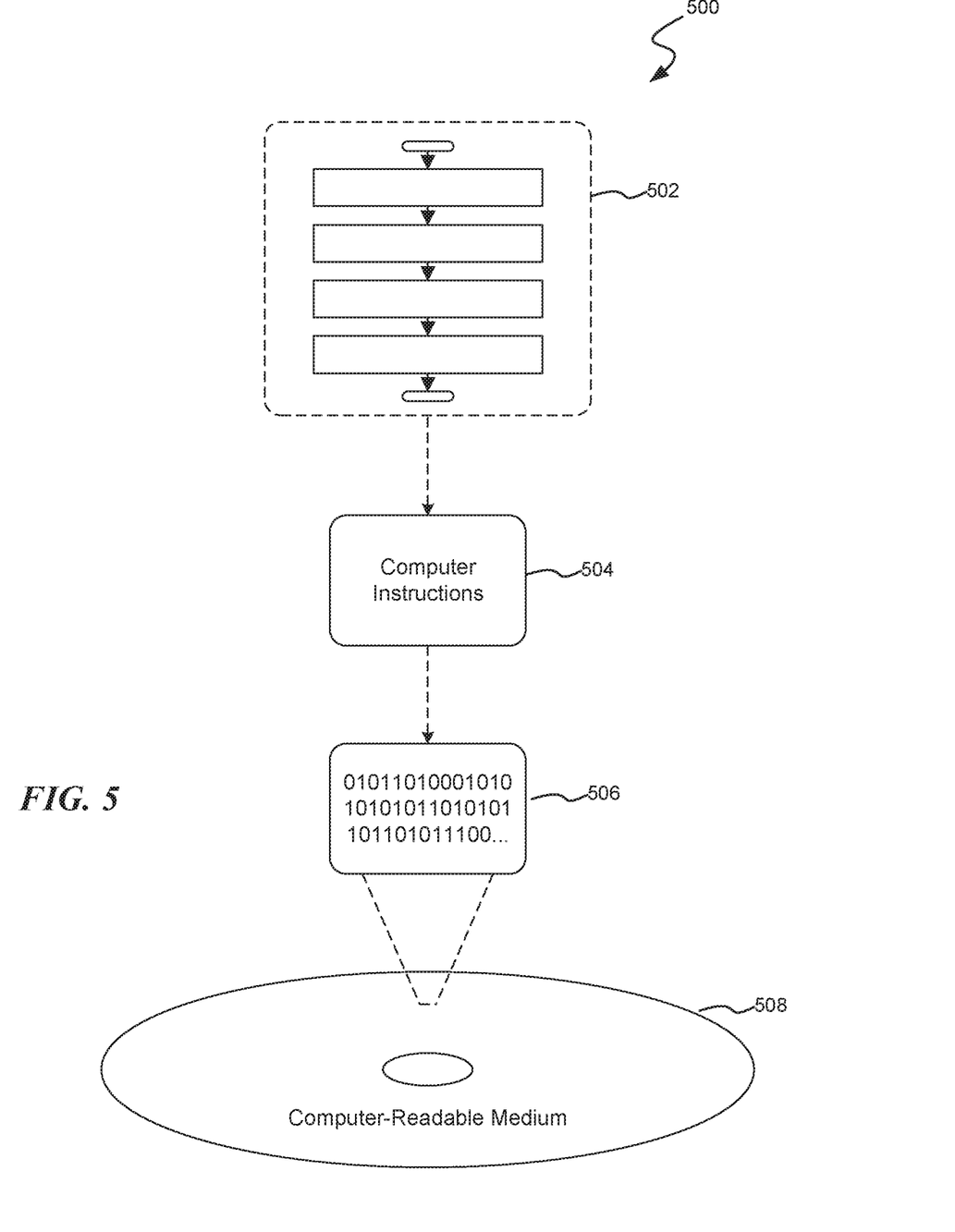
FIG. 5 is a block diagram illustrating an exemplary computer readable medium encoded with instructions for determining a predicted importance of a key-term to a document in accordance with aspects of the disclosed subject matter.

Regarding computer readable media, FIG. 5 is a block diagram illustrating an exemplary computer readable medium encoded with instructions for identifying key-terms of a document with corresponding scores indicative of their importance to the document, in accordance with aspects of the disclosed subject matter. More particularly, the implementation 500 comprises a computer-readable medium 508 (e.g., a CD-R, DVD-R or a platter of a hard disk drive), on which is encoded computer-readable data 506. This computer-readable data 506 in turn comprises a set of computer instructions 504 configured to operate according to one or more of the principles set forth herein. In one such embodiment 502, the processor-executable instructions 504 may be configured to perform a method, such as at least some of exemplary routine 200 and the general processes set forth in FIGS. 1, 3 and 4, for example. In another such embodiment, the processor-executable instructions 504 may be configured to implement a system on a computing device, such as at least some of the exemplary, executable components of computing device 600 of FIG. 6, as described below. Many such computer readable media may be devised, by those of ordinary skill in the art, which are configured to operate in accordance with the techniques presented herein.

Figure 6:
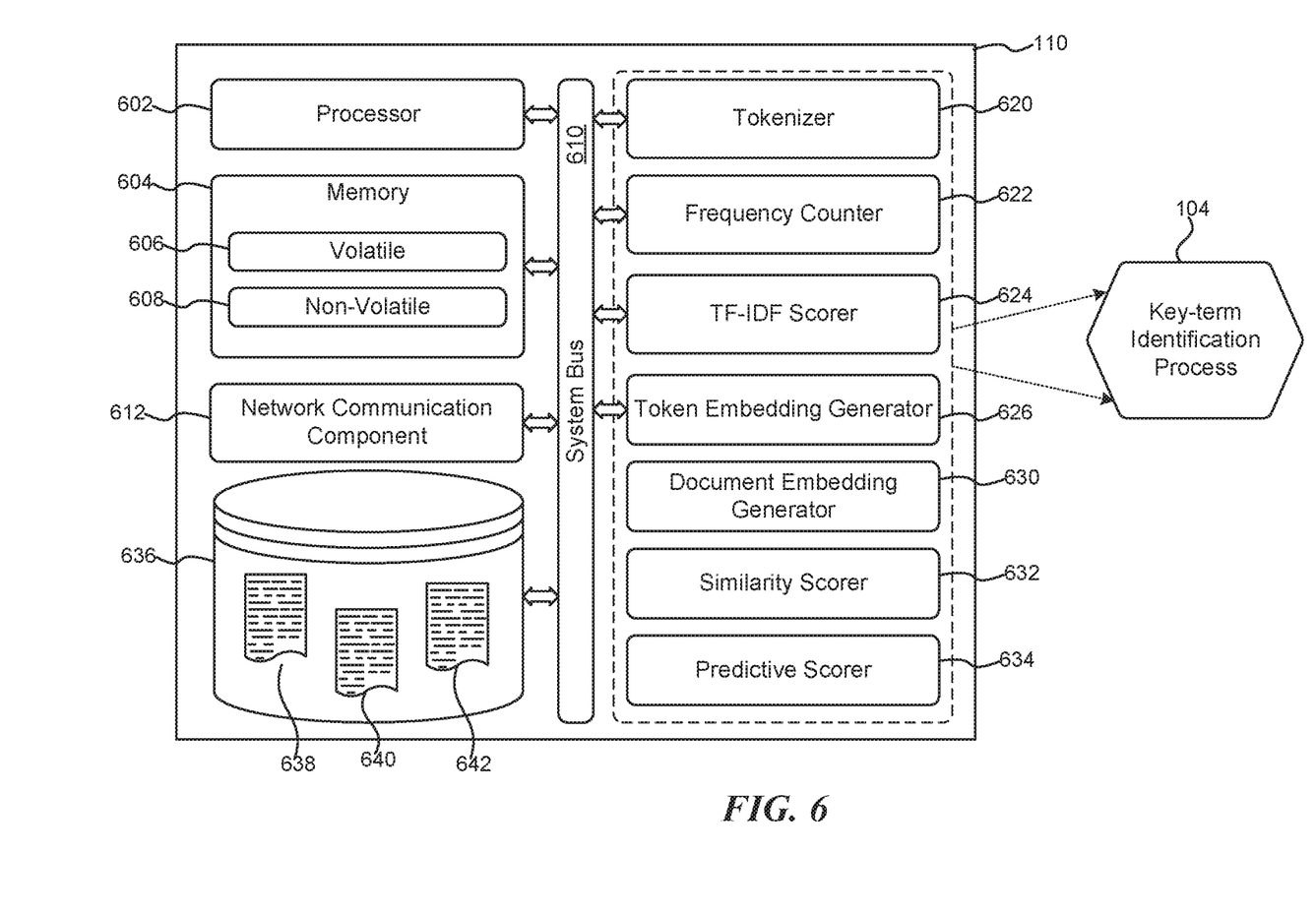
FIG. 6 is a block diagram illustrating an exemplary computer system suitably configured for implementing a system for predicting the importance of a key-term to a document according to aspects of the disclosed subject matter.

Turning now to FIG. 6, FIG. 6 is a block diagram illustrating an exemplary computing system 110 (or computing device) suitably configured for identifying key-terms of a document according to aspects of the disclosed subject matter. As those skilled in the art will readily appreciate, a typical computing system, such as computing system 110, includes one or more central processing units (or CPUs), such as CPU 602, and further includes at least one memory 604. The CPU 602 and memory 604, as well as other components of the computing system, are typically interconnected by way of a system bus 610.

As will be further appreciated by those skilled in the art, the memory 604 typically (but not always) comprises both volatile memory 606 and non-volatile memory 608. Volatile memory 606 retains or stores information so long as the memory is supplied with power. In contrast, non-volatile memory 608 is capable of storing (or persisting) information even when a power supply is not available. Generally speaking, RAM and CPU cache memory are examples of volatile memory 606, whereas ROM, solid-state memory devices, programmable logic arrays, EPROMs, memory storage devices, and/or memory cards are examples of non-volatile memory 608.

As will be further appreciated by those skilled in the art, in operation the CPU 602 executes instructions retrieved from the memory 604, from computer readable media, such as computer readable media 508 of FIG. 5, and/or other executable components in carrying out the various functions of the disclosed subject matter. The CPU 602 may be comprised of any number of available processors such as single-processor, multi-processor, single-core units, and multi-core units, which are well known in the art.

Further still, the illustrated computing system 110 typically includes a network communication interface 612 for interconnecting the computing system with other devices, computers and/or services over a computer network. The network communication interface 612, sometimes referred to as a network interface card or NIC, communicates over the network using one or more communication protocols via a physical/tangible (e.g., wired, optical fiber, etc.) connection, a wireless communication protocol such as WiFi or Bluetooth communication protocols, NFC, or a combination of both. As will be readily appreciated by those skilled in the art, a network communication interface, such as network communication component 612, is typically comprised of hardware and/or firmware components (and may also include or comprise executable software components) that transmit and receive digital and/or analog signals from other components and/or devices over a transmission medium (e.g., the network).

According to aspects of the disclosed subject matter, the illustrated computing system 110 includes additional executable components that, in cooperative execution, carry out the operations of the key-term identification process 104 discussed above. These additional executable components (set forth according to the logical functionality) include a tokenizer 620, a frequency counter 622, a TF-IDF scorer 624, a token embedding component 626, a document embedding generator 630, a similarity scorer 632, and a predictive scorer 634.

In execution and operation, and according to aspects of the disclosed subject matter, the tokenizer 620 parses a document, such as document 102, to identify tokens within the document. Parsing and tokenizing the document is set forth above in regard to block 204 of routine 200. As discussed above, tokenizing words or phrases of a document includes segmenting textual content into words according to white space and punctuation. This tokenizing further includes generating tokens comprising multiple words to form phrases, typically in conjunction with one or more topical and/or entity dictionaries and/or ontologies to identify when two or more adjacent words, when combined, form a phrase. Contextual information of the document and document location may also be considered when tokenizing words and phrases. The result is a set of tokens that are candidate key-terms for the corresponding document.

In execution and operation, and according to aspects of the disclosed subject matter, the frequency counter 622 determines the frequency of the various tokens identified by the tokenizer 620, as well as the locations of the token instances. Typically, though not exclusively, the frequency counter 622 operates in conjunction with the tokenizer such that the frequency of any given token is appropriately incremented as an instance of that token in encountered/tokenized. The result of the frequency counter 622 is a set of counts corresponding to instances of a given token within the document. Additionally, though not necessarily, the counts are broken out according to locations in which instances of the given token is encountered. Counting tokens and capturing location information is discussed above in regard to block 208 of routine 200.

In execution and operation, and according to aspects of the disclosed subject matter, the TF-IDF scorer 624 generates a TF-IDF score for each of the identified tokens of the document. As discussed above in regard to block 210, the TF-IDF scorer 624 generates a score as a function of the term frequency (TF) of the document (as determined by the frequency counter 622) and the overall frequency of the corresponding term in a corpus of documents. Typically, though not exclusively, the overall frequency is determined according to a frequency document representative of a corpus of documents, such as frequency document 638 stored in data store 636. According to additional aspects of the disclosed subject matter, the TF-IDF scorer 624 generates a score for a token according to a location-weighted function in which the term frequency of a token is weighted according to the location(s) of the various instances of the token in the document. This weighting, as discussed above in regard to block 210, may be found in a predetermined weighting schedule or list associating document locations with weighting values, such as weighting schedule 640 stored in the data store 636.

In execution and operation, and according to aspects of the disclosed subject matter, the token embedding component 626 is configured to determine an embedding vector for each token of the document. As discussed above in regard to block 212 of routine 200, the token embedding component 626 determines the embedding vectors for the tokens according to online services available to generate the embedding vector for a given word or phrase. In one embodiment, the token embedding component 626 obtains the embedding vectors for the tokens from the semantic network service conceptnet.io, while any of one or more other online semantic network services providers may be used. Further still, a machine learning model may be trained to generate embedding vectors for tokens (words and/or phrases).

In execution and operation, and according to aspects of the disclosed subject matter, the document embedding generator 630 operates to generate a document embedding vector from the set of tokens (via their corresponding embedding vectors) of the document. Generating the document embedding vector is set forth above in regard to block 216 of routine 200. As discussed above, the document embedding generator 630 generates the document embedding vectors as an average of the embedding vectors of the various tokens of the document. Additionally and according to aspects of the disclosed subject matter, this average may be a weighting average, i.e., this averaging may incorporate the TF-IDF scores of the tokens in computing the averages of the various dimensions of the embedding vectors, such that embedding vector values for tokens with higher TF-IDF scores are weighted more strongly in the averaging process than the embedding vector values for tokens with lower TF-IDF scores. This weighting may be determined according to predetermined values and/or schedules based on the TF-IDF scores.

In execution and operation, and according to aspects of the disclosed subject matter, the similarity scorer 632 determines similarity scores for each of the tokens. These similarity scores, as set forth above in regard to block 220 of routine 200, indicate a similarity of the token to the document. In various embodiments of the disclosed subject matter, these similarity scores are determined according to the cosine similarity between a token's embedding vector and the document's embedding vector. According to aspects of the disclosed subject matter, a higher similarity score is an indication that the corresponding token has a similarly high importance to the document, indicative of a key-term of the document.

In execution and operation, and according to aspects of the disclosed subject matter, the predictive scorer 634 operates to provide an overall score for a given token, where the overall score is a predicted indication of the importance of the token/key-term to the document. Determining an overall score is discussed above in regard to block 222 of routine 200. The predictive scorer 634 gathers input data for the tokens of the document, generates input data for each of the tokens, and provides the input data to a trained machine learning model where an analysis is carried out to generate a predicted overall score for the token with respect to the document. Indeed, information such as, by way of illustration and not limitation, the token, term frequencies of the token, the TF-IDF score of the token, the similarity score for the token and the embedding vector of the token are provided to the trained machine learning model to determine the predicted overall score. This overall score is then associated with the corresponding token.

Regarding the various components of the exemplary computing device 110, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including, but not limited to, executable software modules that carry out one or more logical elements of the processes described in this document, or as a hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for identifying key-terms of a document, the method comprising:
   tokenizing a document into a plurality of tokens, each token of the plurality of tokens corresponding to a corresponding term within the document;
   for each token of the plurality of tokens:
     determining a term frequency representing a number of instances the corresponding term of the token occurs in the document;
     determining a term frequency inverse document frequency (TF-IDF) score according to the term frequency;
     determining an embedding vector, wherein the embedding vector is determined according to the corresponding term of the token;
   determining a document embedding vector as a function of the embedding vectors of the plurality of tokens;
   determining a similarity score to the document for each token of the plurality of tokens according to a respective embedding vector of the token and the document embedding vector;
   determining an overall score for each token of the plurality of tokens, wherein the overall score for each token is determined according to the token, the respective embedding vector of the token, the document embedding vector, the TF-IDF score of the token, and the similarity score of the token; and
   selecting, as key-terms for the document, one or more terms corresponding to one or more tokens of the plurality of tokens having the highest overall scores.

2. The computer-implemented method of claim 1, wherein determining the document embedding vector comprises determining the document embedding vector as an average of the embedding vectors of the plurality of tokens.

3. The computer-implemented method of claim 2, wherein the document embedding vector is determined as a weighted average of the embedding vectors of the plurality of tokens, weighted according to the term frequencies of the tokens in the document.

4. The computer-implemented method of claim 3, wherein determining the similarity score to the document for each token of the plurality of tokens comprises determining a cosine similarity score between the respective embedding vector of each token and the document embedding vector.

5. The computer-implemented method of claim 1, wherein determining the similarity score to the document for each token of the plurality of tokens comprises determining a cosine similarity score between the respective embedding vector of each token and the document embedding vector.

6. The computer-implemented method of claim 1, wherein the document comprises a plurality of independent text sources, each text source of the plurality of independent text sources being associated with an item of non-textual content.

7. A computer-readable medium bearing computer-executable instructions which, when executed on a computing system comprising at least a processor, carry out a method for identifying key-terms of a document, the method comprising:
   tokenizing a document into a plurality of tokens, each token of the plurality of tokens corresponding to a corresponding term within the document;
   for each token of the plurality of tokens:
      determining a term frequency representing a number of instances the corresponding term of the token occurs in the document;
      determining a term frequency inverse document frequency (TF-IDF) score according to the term frequency;
      determining an embedding vector according to the corresponding term of the token;
   generating a document embedding vector for the document according to the embedding vector of each of the plurality of tokens;
   determining a similarity score to the document for each token of the plurality of tokens according to the document embedding vector and a respective embedding vector of each token;
   determining an overall score for each token of the plurality of tokens, wherein the overall score for each token is determined according to the token, the respective embedding vector of the token, the document embedding vector, the TF-IDF score of the token, and the similarity score of the token; and
   selecting, as key-terms for the document, one or more terms corresponding to one or more tokens of the plurality of tokens having the highest overall scores.

8. The computer-readable medium of claim 7, wherein determining the similarity score to the document for each token of the plurality of tokens comprises:
   determining a cosine similarity score for each token of the plurality of tokens according to the respective embedding vector of each token and the document embedding vector generated for the document; and
   determining the similarity score as a function of the TF-IDF score and the cosine similarity score for each token of the plurality of tokens.

9. The computer-readable medium of claim 8 further comprising, for each token of the plurality of tokens, capturing document location information of each instance of each token in the document, and associating the document location information with each token.

10. The computer-readable medium of claim 9, wherein the TF-IDF scores of the plurality of tokens are weighted TF-IDF scores, and wherein determining the weighted TF-IDF score for each token of the plurality of tokens comprises determining the weighted TF-IDF score according to the term frequencies of each token in the document, document location information of the token, and a predetermined weighting schedule associating document locations with corresponding weighting values.

11. The computer-readable medium of claim 10, wherein the method further comprises:
   providing a trained machine learning model for generating overall scores according to a term frequency, a document location information, an embedding vector, a cosine similarity score and a TF-IDF score; and
   for each token of the plurality of tokens, determining the overall score according to the trained machine learning model.

12. The computer-readable medium of claim 7, wherein selecting, as key-terms for the document, the one or more terms corresponding to one or more tokens having the highest overall scores comprises selecting, as key-terms for the document, the one or more terms of a predetermined number of tokens having the highest overall scores.

13. The computer-readable medium of claim 7, wherein selecting, as key-terms for the document, the one or more terms corresponding to one or more tokens having the highest overall scores comprises selecting, as key-terms for the document, the terms of a predetermined percentage of tokens having the highest overall scores.

14. The computer-readable medium of claim 7, wherein selecting, as key-terms for the document, the one or more terms corresponding to one or more tokens having the highest overall scores comprises selecting, as key-terms for the document, the terms of a predetermined percentage of tokens having overall scores that meet or exceed a predetermined threshold score.

15. A computer system for identifying key-terms of a document, the computer system comprising a processor and a memory, wherein the processor, in executing instructions stored in the memory, configures the computing system to:
   access a document for processing;
   tokenize the document into a plurality of tokens, each token corresponding to a term occurring at least once within the document;
   for each token of the plurality of tokens:
      determine a term frequency, wherein the term frequency indicates a number of instances that a corresponding term of the token occurs in the document;
      determine a term frequency inverse document frequency (TF-IDF) score according to the term frequency; and
      determine an embedding vector, wherein the embedding vector is determined according to the corresponding term of the token;
   generate a document embedding vector for the document according to the embedding vector of each of the plurality of tokens;
   determine a similarity score to the document for each token of the plurality of tokens, wherein the similarity score for each token is determined according to a respective embedding vector for the token and the document embedding vector;
   determine an overall score for each token of the plurality of tokens, wherein the overall score for each token is determined according to the token, a respective embedding vector of the token, the document embedding vector, the TF-IDF score of the token, and the similarity score of the token; and
   select, as key-terms for the document, one or more terms corresponding to one or more tokens of the plurality of tokens having the highest overall scores.

16. The computing system of claim 15, wherein generating the document embedding vector comprises generating the document embedding vector as an average of the embedding vectors of the plurality of tokens.

17. The computing system of claim 16, wherein the average of the embedding vectors of the plurality of tokens is a weighted average of the embedding vectors of the plurality of tokens, weighted according to the similarity scores of the plurality of tokens.

18. The computing system of claim 15, wherein the similarity score for each token of the plurality of tokens is determined as a cosine similarity score between the embedding vector of the token and the document embedding vector.

19. The computing system of claim 15, wherein the TF-IDF scores of the plurality of tokens are weighted TF-IDF scores, determined according to the term frequencies, document location information of the token, and a predetermined weighting schedule associating document locations with corresponding weighting values.

20. The computing system of claim 15, wherein the computing system is further configured to:
provide a trained machine learning model for generating overall scores according to a term frequency, document location information, and a TF-IDF score; and
for each token of the plurality of tokens, determine an overall score according to the trained machine learning model.

* * * * *